US012709276B2

(12) United States Patent
Mauro et al.

(10) Patent No.: US 12,709,276 B2
(45) Date of Patent: Aug. 18, 2026

(54) METHOD FOR THE MULTISTAGE FUSION OF MEASUREMENT DATA

(71) Applicant: Robert Bosch GmbH, Stuttgart (DE)

(72) Inventors: Matthias Mauro, Neckarsulm (DE); Martin Rabel, Yokohama (JP); Dirk Huelsebusch, Stuttgart (DE); Ingmar Berger, Muehlacker (DE); Junyi Tao, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 205 days.

(21) Appl. No.: 18/559,116

(22) PCT Filed: Jul. 11, 2022

(86) PCT No.: PCT/EP2022/069290
§ 371 (c)(1),
(2) Date: Nov. 6, 2023

(87) PCT Pub. No.: WO2023/030732
PCT Pub. Date: Mar. 9, 2023

(65) Prior Publication Data

US 2024/0239348 A1 Jul. 18, 2024

(30) Foreign Application Priority Data

Sep. 6, 2021 (DE) ..................... 10 2021 209 817.7

(51) Int. Cl.
*B60W 40/02* (2006.01)
*B60W 50/08* (2020.01)

(52) U.S. Cl.
CPC ........... *B60W 40/02* (2013.01); *B60W 50/08* (2013.01)

(58) Field of Classification Search
CPC ...... B60W 40/02; B60W 50/08; G08G 1/165; G08G 1/166; G01S 13/867; G01S 13/931;
(Continued)

(56) References Cited

U.S. PATENT DOCUMENTS 10,571,920 B2 * 2/2020 Poledna .............. G06F 11/1487
2015/0307110 A1 * 10/2015 Grewe ................ B60W 50/029 701/36

(Continued)

FOREIGN PATENT DOCUMENTS

DE 102017206123 A1 10/2018

OTHER PUBLICATIONS

Functional safety concept design of hybrid electric vehicle following ISO 26262 (Year: 2014).*

(Continued)

*Primary Examiner* — Fadey S. Jabr
*Assistant Examiner* — Faris Asim Shaikh
(74) *Attorney, Agent, or Firm* — NORTON ROSE FULBRIGHT US LLP

(57) ABSTRACT

A method for the fusion of measurement data from a plurality of on-board sensors. Measurement data ascertained by a first group of sensors are received by a first controller or by a first module, and are fused to form a first environmental model. The measurement data are used with a first functional safety rating by the first environmental model, or the first environmental model is created based on the measurement data. Measurement data ascertained by at least one second group of sensors are received by at least one second controller or by at least one second module, and are fused to form at least one second environmental model. The measurement data of the second group are used with a second functional safety rating by the second environmental model,
(Continued)

or the at least one second environmental model is created based on the measurement data of the second group.

8 Claims, 3 Drawing Sheets

(58) Field of Classification Search
CPC ........ G06F 18/25; G06V 10/80; G06V 20/56; G06V 20/58
See application file for complete search history.

(56) References Cited

U.S. PATENT DOCUMENTS

2017/0151979 A1* 6/2017 Maeda ................. B62D 5/0481
2018/0273044 A1* 9/2018 Son ....................... B60W 40/06
2018/0370540 A1 12/2018 Yousuf et al.
2019/0279000 A1* 9/2019 Pfeifle .................... G08G 1/165
2020/0191578 A1* 6/2020 Körner ............... G01C 21/3811
2021/0086788 A1* 3/2021 Nordbruch ......... B60W 60/0011
2021/0114615 A1* 4/2021 Buerkle .................. G06F 18/25
2021/0122395 A1* 4/2021 Pfadler ................ G08G 1/0141
2021/0403037 A1* 12/2021 Horigome .............. G06V 20/56
2022/0289246 A1* 9/2022 Sallem .............. B60W 60/0027
2022/0413148 A1* 12/2022 Pfeil ..................... G01S 13/931
2023/0155806 A1* 5/2023 Abdelhameed ... H04L 12/40013 370/503
2023/0177001 A1* 6/2023 Vieweger ............ G06F 15/8038 714/10
2023/0266788 A1* 8/2023 Chen ..................... H04J 3/0638 713/400
2023/0294717 A1* 9/2023 Sautter ............ B60W 60/00272 701/27
2024/0051554 A1* 2/2024 Ko .................... B60W 60/0015
2024/0089143 A1* 3/2024 Xia ......................... H04L 12/40
2024/0132058 A1* 4/2024 Sugiyama ............... H04L 12/28
2025/0222939 A1* 7/2025 Cerdeiro ........... B60W 60/0015

OTHER PUBLICATIONS

International Search Report for PCT/EP2022/069290, Issued Oct. 13, 2022.

* cited by examiner 1
front radar
video or camera sensor
lane sensor
hardware-in-the-loop
radar sensors
10
12
4
6
8
9
16
17
18
19
first controller
22
second controller
24
26
emergency braking functions
14
highway assistant
20

Fig. 2

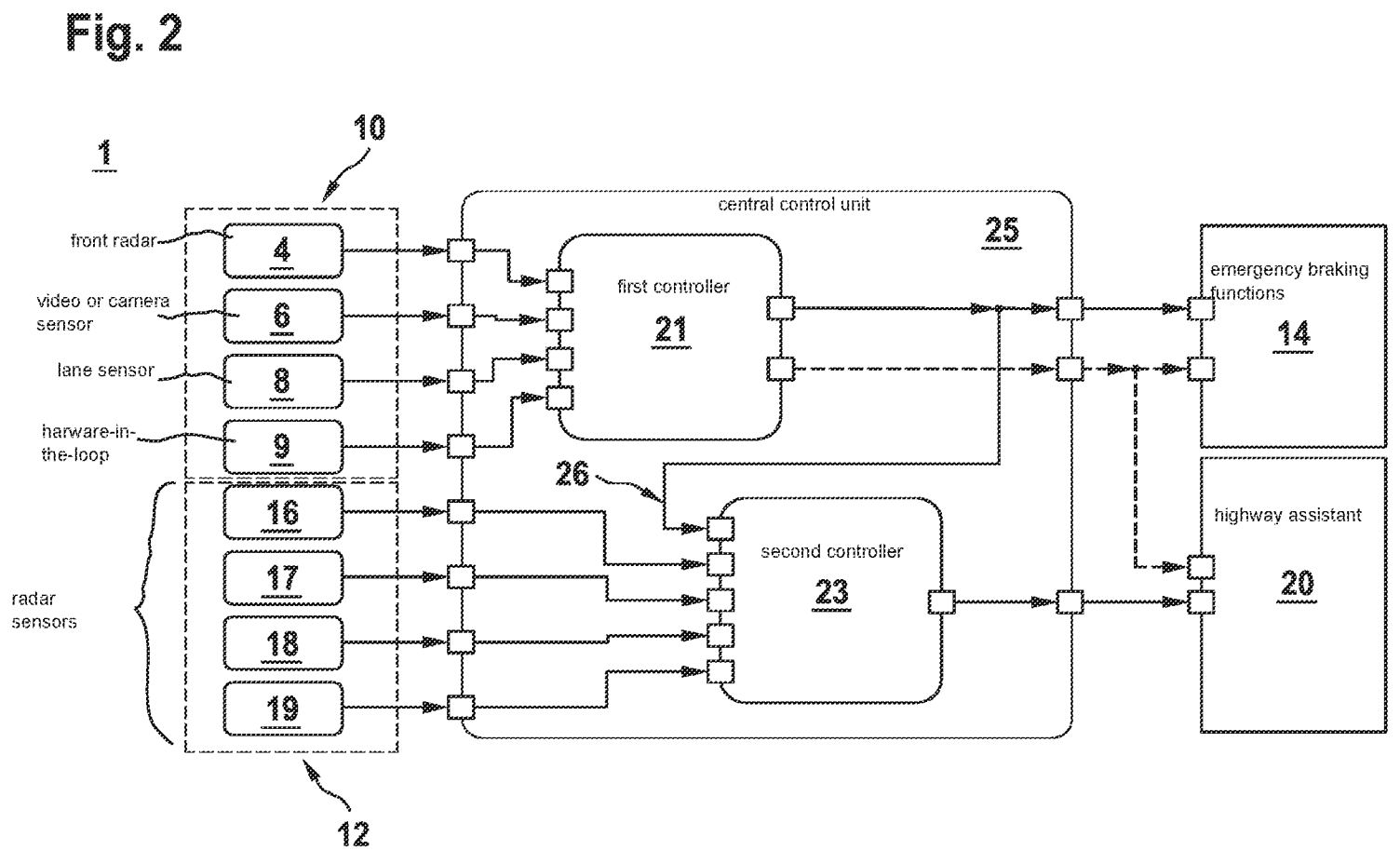

1 front radar
video or camera sensor
lane sensor
harware-in-the-loop
radar sensors
4
6
8
9
16
17
18
19
10
12
central control unit
25
first controller
21
second controller
23
26
emergency braking functions
14
highway assistant
20

METHOD FOR THE MULTISTAGE FUSION OF MEASUREMENT DATA

FIELD

The present invention relates to a method for the fusion of measurement data from a plurality of on-board sensors, to a controller, a computer program, and a machine-readable storage medium.

BACKGROUND INFORMATION

Representation of the vehicle environment is usually required to implement various driving assistance functions and emergency braking functions. Depending on the characteristic and performance requirement, measurement data of a plurality of sensors are received and fused together for this purpose. For example, for a current EU NCAP 2020 requirement, a one radar one video (1R1V) fusion is needed to combine the more accurate measurement methods of the radar sensor with the better angular quality and the classification capabilities of a video sensor. The installation position is in this case central on the vehicle front and the coverage range is oriented in the driving direction.

Emergency braking functions and driving assistance functions have different functional safety requirements defined in different ASIL ratings. For example, emergency braking functions require ASIL-B ratings since they can be used directly without driver confirmation and can result in dangerous situations as a result of erroneous activations. Usually, the central fusion of measurement data of the on-board sensors takes place in the controller, in which the corresponding functional algorithms are also calculated or the environmental models are created. However, the different functional safety ratings are derived from the functional algorithms all the way to the environmental model, always resulting in the more safety-relevant ASIL-B for the latter. There are two options for implementing functions with a different functional safety rating: Either all sensor data contributing to the environmental model likewise fulfill the highest requirement, for example for ASIL-B, or different environmental models with different ratings are calculated in parallel. However, this increases the development and validation effort for the sensors or the resource requirements of the controller.

German Patent Application No. DE 10 2017 206 123 A1 describes a method for the fusion of data from various sensors of a vehicle within the framework of object recognition. The measured variables ascertained from measurement data of different sensors are linked and checked for plausibility in a subsequent processing step.

SUMMARY

An object of the present invention includes providing a method for the fusion of measurement data that lowers the power demand of a controller.

This object may be achieved by features of the present invention. Advantageous embodiments of the present invention are disclosed herein.

According to one aspect of the present invention, a method for the fusion of measurement data from a plurality of on-board sensors is provided. According to an example embodiment of the present invention, measurement data ascertained by a first group of sensors are received by a first controller or by a first module of a central control unit. Subsequently, the measurement data of the first group of sensors are fused to form a first environmental model or are optionally fused prior to utilization within the framework of the first environmental model.

The at least two groups of sensors may alternatively or additionally also be designed as a group of sensors or as one sensor, which can provide two measurement data sets or at least two groups of measurement data. In this case, the measurement data and/or the sensors in the corresponding groups can also overlap.

The measurement data of the first group of sensors are used with a first functional safety rating by the first environmental model. Alternatively, the first environmental model is created with the first functional safety rating based on the measurement data of the first group.

Furthermore, measurement data ascertained by at least one second group of sensors are received by at least one second controller or by at least one second module of the central control unit and are fused to form at least one second environmental model.

A two-stage measurement data fusion thus takes place, in which the second environmental model in the second stage is based on the data or results of the first environmental model and on the measurement data of the second group. The second environmental model can thus be formed from the first environmental model and from measurement data of further sensors.

Depending on the configuration, the first environmental model can also depend on measurement data of the second group of sensors.

Preferably, the measurement data of the second group of sensors are used with a second functional safety rating by the second environmental model. Alternatively, the at least one second environmental model is created with the second functional safety rating, based on the measurement data of the second group.

Preferably, the first functional safety rating differs from the at least one second functional safety rating. The first rating is preferably higher than the second rating. Thus, for example, the first rating can be designed as ASIL-B, ASIL-C or ASIL-D, and the second rating can be defined as ASIL-A or QM in accordance with ISO 26262.

In addition to the first environmental model, according to an example embodiment of the present invention, a plurality of second environmental models can be used, which respectively have different functional safety ratings. In this case, environmental models and measurement data with a common rating can be processed on a common controller or a common module of the central control unit.

The method allows for a multistage fusion of measurement data of different sensors with a different functional safety rating. For example, a two-stage fusion allows only an ASIL-B-relevant environmental model to be generated in a first step and its output combined with further QM sensor data to be fused in a separate second step. This results, for example, in two environmental models which can be used in the respective functions with a different ASIL rating. For example, an ASIL-B-rated environmental model can receive measurement data from sensors at the lowest latency, as a result of which only the additional computing effort for processing the sensors of the second group arises in the second environmental model, which is rated as QM, for example.

The principle of multistage fusion can be transferred to any number of stages as long as the different environmental models are connected with a decreasing functional safety rating.

According to a further aspect of the present invention, at least one controller is provided, wherein the controller is configured to perform the method. The controller may, for example, be an on-board controller, an off-board controller, or an off-board server unit, such as a cloud system.

According to an example embodiment of the present invention, the controller can be designed as a central control unit with one or different modules for processing different environmental models. Alternatively, the controller may be designed as a first controller or as a second controller.

In addition, according to one aspect of the present invention, a computer program is provided, which comprises instructions that, when the computer program is executed by a computer or a controller, cause the computer or controller to perform the method according to the present invention. According to a further aspect of the present invention, a machine-readable storage medium is provided, on which the computer program according to the present invention is stored.

According to an example embodiment of the present invention, the vehicle can in this case be operated in an assisted, partially automated, highly automated and/or fully automated, or driverless, manner in accordance with the BASt standard.

In one exemplary embodiment of the present invention, the measurement data ascertained by the first group of sensors are received with a functional safety of ASIL-B or higher. As a result, the measurement data are received at a minimum latency by the first controller or by the first module of the central control unit so that particularly safety-critical functions can be implemented.

According to a further embodiment of the present invention, at least one output of the first environmental model is provided to the second environmental model. As a result of this measure, measurement data already processed in the first environmental model no longer have to be processed by the second environmental model, which reduces the power demand required by the controllers or the central control unit.

According to a further exemplary embodiment of the present invention, the first environmental model is created with a higher functional safety rating than the second environmental model. Preferably, the first environmental model and further second environmental models are created in the form of a cascade with increasing gradation of functional safety. Separate processing of measurement data and environmental models with a different functional safety rating can thereby be realized. The parallel processing of all measurement data can in this case be omitted if the environmental models with a lower rating obtain the results or outputs from environmental models with a higher ASIL rating as an additional input.

According to a further exemplary embodiment of the present invention, the first environmental model is created with at least an ASIL-B functional safety rating and the second environmental model is created with an ASIL-A or a QM functional safety rating. Thus, for example, video sensors and radar sensors directed in the driving direction can be processed particularly optimally within the framework of the ASIL-B rating, and the further radar sensors arranged on the vehicle, such as corner radars, can be processed by an environmental model with a QM functional safety rating.

According to a further exemplary embodiment of the present invention, the output of the first environmental model is provided to at least one first driving assistance function, and the output of the second environmental model is provided to at least one second driving assistance function. The first driving assistance function may, for example, be designed as an emergency brake assist system. The at least one second driving assistance function may, for example, be designed as a lane departure warning system, a lane-change assistant, a turn-off assistant, and the like. In this case, the second driving assistance function can likewise benefit from the outputs of the first environmental model supplied to the second environmental model.

Preferred exemplary embodiments of the present invention are described in more detail below with reference to highly simplified schematic representations.

BRIEF DESCRIPTION OF THE DRAWINGS

FIG. 2 shows a further, schematic sensor arrangement for illustrating a method according to the present invention, according to one example embodiment of the present invention.

DETAILED DESCRIPTION OF EXAMPLE EMBODIMENTS

Figure 1:
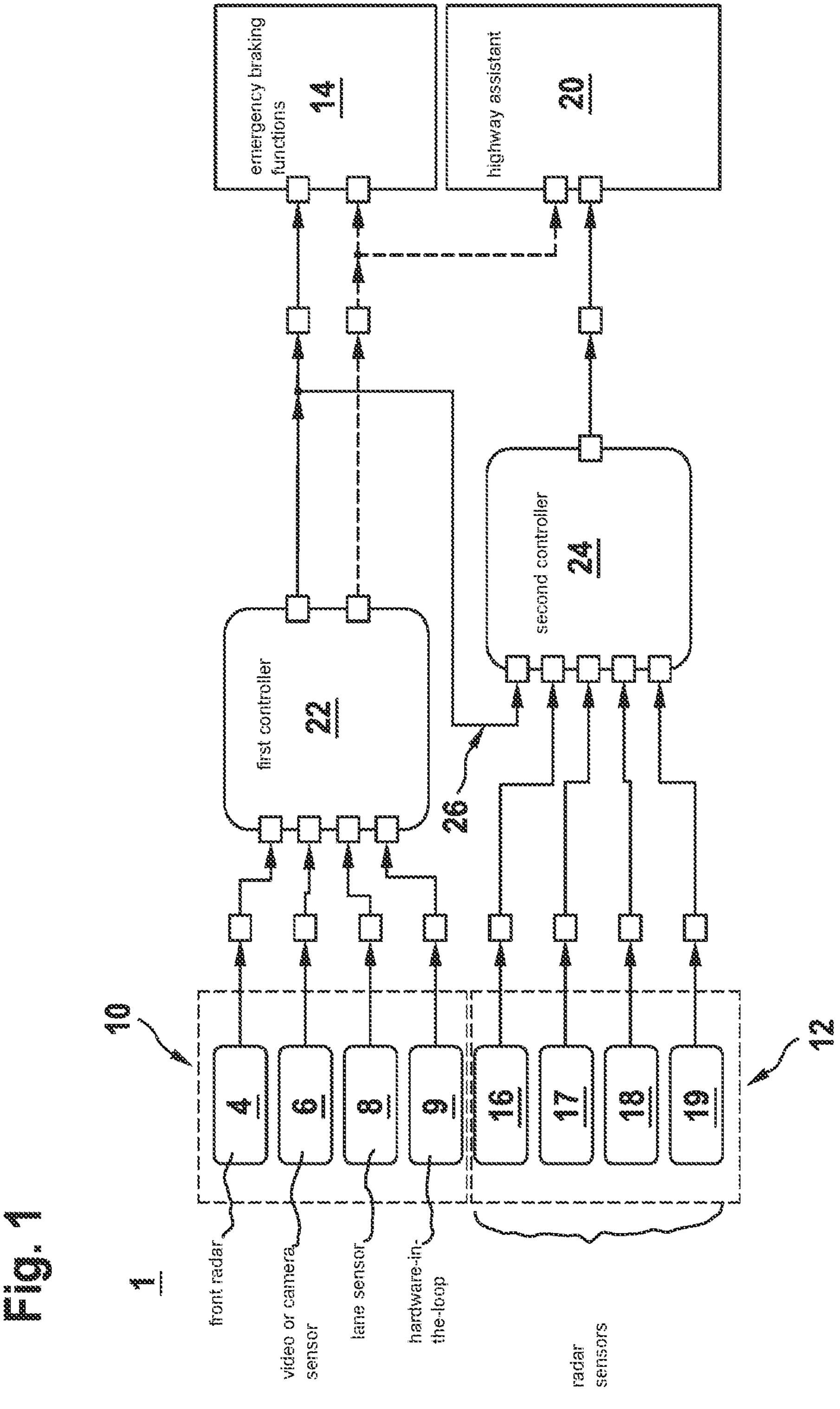
FIG. 1 shows a schematic sensor arrangement for illustrating a method according to the present invention, according to one example embodiment of the present invention.
Figure 3:
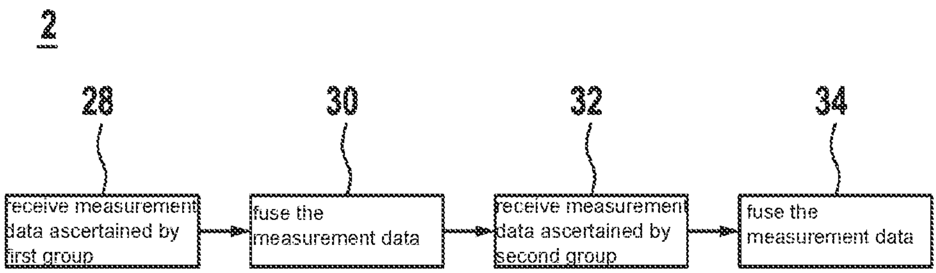
FIG. 3 shows a schematic diagram for illustrating a method according to the present invention, according to a further example embodiment.

FIG. 1 shows a schematic sensor arrangement 1 for illustrating a method 2 according to the present invention, which is described in more detail in FIG. 3, according to one embodiment.

The sensor arrangement 1 can, for example, be an on-board sensor arrangement that comprises a front radar 4, a video sensor, or camera sensor, 6 oriented in the driving direction, and video-based lane sensors 8. These sensors 4, 6, 8 form a first group 10 of sensors, which can generate measurement data at a particularly low latency and forward them for further utilization. By means of the sensors 4, 6, 8 associated with the first group 10, safety-critical driving functions, such as emergency braking functions 14, which require an ASIL-B or a higher functional safety rating, can be realized. In addition, a so-called HIL (hardware-in-the-loop) 9 can be provided in the first group 10 in order, for example, to implement pre-processing of the measurement data of the sensors 4, 6, 8.

Provided in addition to the first group 10 of sensors is also a second group 12 of sensors which operate at a lower functional safety rating, for example ASIL-A or QM. In the exemplary embodiment shown, the second group 12 comprises four radar sensors 16, 17, 18, 19, which can be arranged at four corner positions of a vehicle (not described in more detail). For example, the measurement data of the sensors 16, 17, 18, 19 of the second group 12 can be used to implement a highway assistant 20 as a driving assistance function.

In the exemplary embodiment shown, the measurement data of the sensors of the first group 10 are fused within the framework of an ASIL-B rating in a first controller 22. In addition, the measurement data of the sensors of the second group 12 are fused within the framework of a lower QM rating in a second controller 24.

The first controller 22 utilizes the measurement data to create or execute a first environmental model. A corresponding output 26 of the first environmental model is supplied as an input to a second environmental model, which is created or executed by the second controller 24. In addition, the second controller 24 also uses the measurement data of the sensors of the second group 12 as inputs for the second environmental model, as a result of which the highway assistant 20 can benefit from the measurement data of the sensors of the first group 10 and of the first environmental model.

Analogously to FIG. 1, FIG. 2 shows a schematic sensor arrangement 1 for illustrating a method 2 according to the present invention, according to a further embodiment. In contrast to FIG. 1, the first environmental model is created or executed by a first module 21 of a central control unit 25, and the second environmental model is created or executed by a second module 23 of the central control unit 25.

FIG. 3 shows a schematic diagram for illustrating a method 2 according to the present invention, according to a further embodiment. The method 2 is used for the fusion of measurement data of a plurality of on-board sensors 4, 6, 8, 16, 17, 18, 19.

Measurement data ascertained by a first group 10 of sensors are received by a first controller 22 or by a first module 21 of a central control unit 25. (Step 28). Subsequently, the measurement data of the first group 10 of sensors 4, 6, 8 are fused to form a first environmental model or are optionally fused prior to utilization within the framework of the first environmental model. (Step 30).

The measurement data of the first group 10 of sensors 4, 6, 8 are used with a first functional safety rating, for example ASIL-B, by the first environmental model. Alternatively, the first environmental model is created with the first functional safety rating, based on the measurement data of the first group 10.

Furthermore, measurement data ascertained by at least one second group 10 of sensors 16, 17, 18, 19 are received by at least one second controller 24 or by at least one second module 23 of the central control unit 25 (step 32) and are fused to form at least one second environmental model (step 34).

Preferably, the measurement data of the second group 12 of sensors are used with a second functional safety rating, for example QM or ASIL-A, by the second environmental model. Alternatively, the at least one second environmental model is created with the second functional safety rating, based on the measurement data of the second group 12.

The invention claimed is:

1. A vehicle control method comprising:

receiving, by a first controller or by a first module of a central control unit of a vehicle, measurement data ascertained by a first group of on-board sensors that are on board a vehicle, the first group of on-board sensors having a higher functional safety classification than a second group of on-board sensors that are on board the vehicle;

fusing the measurement data ascertained by the first group of on-board sensors to form a first environmental model;

receiving, by at least one second controller or by at least one second module of the central control unit, measurement data ascertained by the second group of on-board sensors of the vehicle;

generating a second environmental model using the first environmental model in combination with the measurement data of the second group of on-board sensors;

executing, by the vehicle, first vehicle control operations using the first environmental model independent of the second environmental model, wherein the first vehicle control operations are classified by the vehicle with the higher functional safety classification than second vehicle control operations; and executing, by the vehicle, second vehicle control operations using the second environmental model, wherein the first and second vehicle control operations control at least one actuator of the vehicle.

2. The method according to claim 1, wherein the measurement data ascertained by the first group of on-board sensors are received with a functional safety classification of ASIL-B or higher.

3. The method according to claim 1, wherein at least one output of the first environmental model is provided as input for generating the second environmental model.

4. The method according to claim 1, wherein the first environmental model and the second environmental model are created in the form of a hierarchical cascade of environmental models, with the functional safety classifications increasing in a direction from a lower hierarchical level to a higher hierarchical level, and wherein the environmental model at the lower hierarchical level is generated based on the environmental model at the higher hierarchical level.

5. The method according to claim 4, wherein the first environmental model has a functional safety classification of at least ASIL-B, and the second environmental model has a functional safety classification of ASIL-A or a QM.

6. The method according to claim 1, wherein output of the first environmental model is provided to at least one first driving assistance function associated with the first vehicle control operations, and output of the second environmental model is provided to at least one second driving assistance function associated with the second vehicle control operations.

7. A controller system of a vehicle, the controller system comprising a first controller and a second controller or a central control unit that is programmed with a first module and a second module, the controller system being configured to perform a vehicle control method, the controller system being configured to:

receive, by the first controller or by the first module of the central control unit of the vehicle, measurement data ascertained by a first group of on-board sensors that are on board the vehicle, the first group of on-board sensors having a higher functional safety classification than a second group of on-board sensors that are on board the vehicle;

fuse the measurement data ascertained by the first group of on-board sensors to form a first environmental model;

receive, by the second controller or by the second module of the central control unit, measurement data ascertained by the second group of on-board sensors of the vehicle;

generate a second environmental model using the first environmental model in combination with the measurement data of the second group of on-board sensors;

execute first vehicle control operations using the first environmental model independent of the second environmental model, wherein the first vehicle control operations are classified by the vehicle with the higher functional safety classification than second vehicle control operations; and execute second vehicle control operations using the second environmental model, wherein the first and second vehicle control operations control at least one actuator of the vehicle.

8. A non-transitory machine-readable storage medium on which is stored instructions that are executable by a controller system of a vehicle, the controller system including a first controller and a second controller or a central control unit that is programmed with a first module and a second module, the instructions, when executed by the controller system, causing the controller system to perform the following steps:

receiving, by the first controller or by the first module of the central control unit of the vehicle, measurement data ascertained by a first group of on-board sensors that are on board the vehicle, the first group of on-board sensors having a higher functional safety classification than a second group of on-board sensors that are on board the vehicle;

fusing the measurement data ascertained by the first group of on-board sensors to form a first environmental model;

receiving, by the second controller or by the second module of the central control unit, measurement data ascertained by the second group of on-board sensors of the vehicle;

generating a second environmental model using the first environmental model in combination with the measurement data of the second group of on-board sensors;

executing first vehicle control operations using the first environmental model independent of the second environmental model, wherein the first vehicle control operations are classified by the vehicle with the higher functional safety classification than second vehicle control operations; and executing second vehicle control operations using the second environmental model, wherein the first and second vehicle control operations control at least one actuator of the vehicle.

* * * * *